(12) United States Patent
Fleischer et al.

(10) Patent No.: US 8,560,924 B2
(45) Date of Patent: Oct. 15, 2013

(54) REGISTER FILE SOFT ERROR RECOVERY

(75) Inventors: Bruce M. Fleischer, Yorktown Heights, NY (US); Thomas W. Fox, Rochester, NY (US); Charles D. Wait, Rochester, CT (US); Adam J. Muff, Rochester, NY (US); Alfred T. Watson, III, Rochester, NY (US)

(73) Assignee: International Business Machines Corporation, Armonk, NY (US)

( * ) Notice: Subject to any disclaimer, the term of this patent is extended or adjusted under 35 U.S.C. 154(b) by 742 days.

(21) Appl. No.: 12/652,360

(22) Filed: Jan. 5, 2010

(65) Prior Publication Data

US 2011/0167296 A1    Jul. 7, 2011

(51) Int. Cl.
    *G11C 29/00* (2006.01)
(52) U.S. Cl.
    USPC .......................................... 714/764
(58) Field of Classification Search
    USPC .......................................... 714/764
    See application file for complete search history.

(56) References Cited

U.S. PATENT DOCUMENTS

| | | | |
|---|---|---|---|
| 4,584,681 A | 4/1986 | Singh et al. | |
| 5,280,606 A * | 1/1994 | Jippo et al. | 714/2 |
| 6,349,390 B1 | 2/2002 | Dell et al. | |
| 6,625,749 B1 | 9/2003 | Quach | |
| 6,802,039 B1 | 10/2004 | Quach et al. | |
| 7,340,643 B2 | 3/2008 | Grochowski et al. | |
| 7,370,230 B1 | 5/2008 | Flake | |
| 7,512,772 B2 | 3/2009 | Gschwind et al. | |
| 7,865,729 B2 * | 1/2011 | Pritikin | 713/169 |
| 7,987,384 B2 * | 7/2011 | Jacobi et al. | 714/6.24 |
| 2007/0245168 A1 | 10/2007 | Noda et al. | |
| 2008/0168305 A1 | 7/2008 | Gschwind et al. | |
| 2010/0095098 A1 * | 4/2010 | Gschwind | 712/222 |

OTHER PUBLICATIONS

IPCOMOOO137913D; Publication Date: Jun. 29, 2006; "Method for Soft and Timing Error Detection in a Clustered Architecture"; pp. 1-7.

* cited by examiner

*Primary Examiner* — Amine Riad
(74) *Attorney, Agent, or Firm* — Cantor Colburn LLP; William Stock

(57) ABSTRACT

Register file soft error recovery including a system that includes a first register file and a second register file that mirrors the first register file. The system also includes an arithmetic pipeline for receiving data read from the first register file, and error detection circuitry to detect whether the data read from the first register file includes corrupted data. The system further includes error recovery circuitry to insert an error recovery instruction into the arithmetic pipeline in response to detecting the corrupted data. The inserted error recovery instruction replaces the corrupted data in the first register file with a copy of the data from the second register file.

18 Claims, 2 Drawing Sheets

REGISTER FILE SOFT ERROR RECOVERY

This invention was made with Government support under contract number B554331 awarded by The Department of Energy. The Government has certain rights to this invention.

BACKGROUND

This invention relates generally to soft errors in computing storage devices, and more particularly, to circuitry to recover from soft errors in register files.

Soft errors are phenomena seen in electronic devices when an extraneous charge is introduced into the system, causing an incorrect value to be observed on a signal or in a storage element. Some sources of the extraneous charge may include alpha particle emission from radioactive decay in circuit packages, or neutron flux from cosmic rays or environmental radiation. Storage elements such as register files and memory arrays are particularly susceptible to soft errors due to the increased likelihood that this transient disturbance will be captured by the storage element, as compared to an event on a combinatorial circuit node, which will propagate to the next storage element downstream, but is less likely to be captured at just the right moment. Remedial schemes are used in computing devices to detect and correct soft errors. Error detection refers to the act of ascertaining that a disturbing event has occurred, while error correction refers to the process of reproducing the original, uncorrupted data pattern.

Parity bits are error detection codes used to detect the corruption of other bits within a group of bits, which they monitor, due to soft error events in static hardware resources. A parity bit contains no information as to the individual values of the bits it represents, but rather indicates whether there are an even or odd number of "ones" in the group of bits to which it is associated. If an odd number of bits within the group (including the parity bit itself and the group of bits it represents) get corrupted, the parity bit will no longer represent the even-ness (or odd-ness) of the group, thereby indicating an error. However, the original pattern of ones and zeros cannot be reconstructed purely from this knowledge alone.

SUMMARY

An exemplary embodiment is a system for performing soft error recovery. The system includes a first register file and a second register file that mirrors the first register file. The system also includes an arithmetic pipeline for receiving data read from the first register file, and error detection circuitry to detect whether the data read from the first register file includes corrupted data. The system further includes error recovery circuitry to insert an error recovery instruction into the arithmetic pipeline in response to detecting the corrupted data. The inserted error recovery instruction replaces the corrupted data in the first register file with a copy of the data from the second register file.

Another exemplary embodiment is a computer implemented method for performing soft error recovery. The method includes receiving data read from a first register file. The method further includes detecting, using error detection circuitry in the computer, whether the data read from the first register file includes corrupted data. An error recovery instruction is inserted by error recovery circuitry into the arithmetic pipeline in response to detecting the corrupted data. The inserted error recovery instruction replaces the corrupted data in the first register file with a copy of the data from a second register file that mirrors the first register file.

A further exemplary embodiment is a computer program product for performing soft error recovery. The computer program product includes a tangible storage medium readable by a processing circuit and storing instructions for execution by the processing circuit for performing a method. The method includes receiving data read from a first register file. The method further includes detecting whether the data read from the first register file includes corrupted data. An error recovery instruction is inserted into an arithmetic pipeline in response to detecting the corrupted data. The inserted error recovery instruction replaces the corrupted data in the first register file with a copy of the data from a second register file that mirrors the first register file.

Additional features and advantages are realized through the techniques of the present embodiment. Other embodiments and aspects are described herein and are considered a part of the claimed invention. For a better understanding of the invention with the advantages and features, refer to the description and to the drawings.

BRIEF DESCRIPTION OF THE SEVERAL VIEWS OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
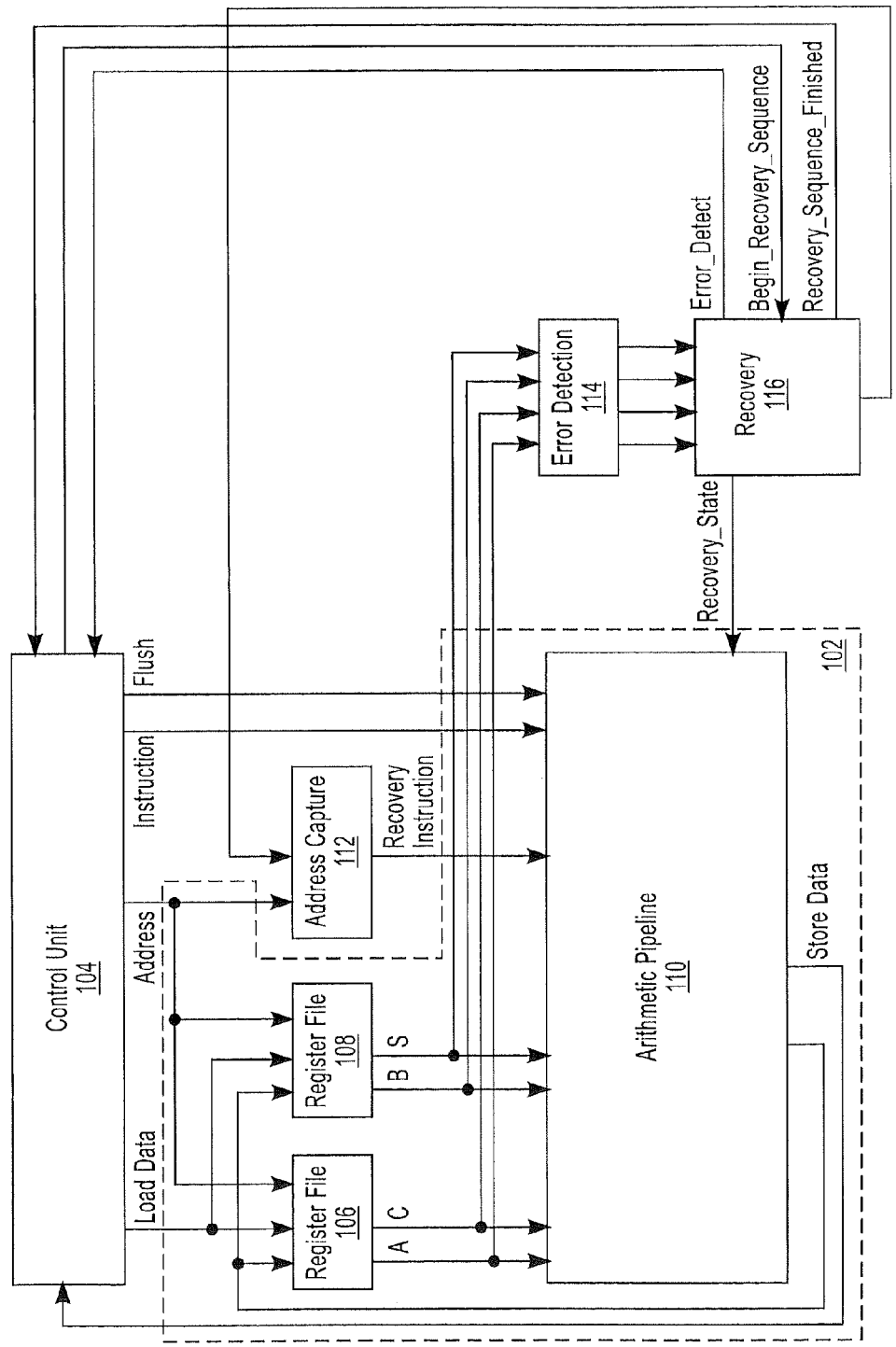
FIG. 1 illustrates a block diagram of a system for performing recovery for register file soft errors that may be implemented by an exemplary embodiment.

Exemplary embodiments of the present invention are directed to a mechanism for correcting soft errors in a register file by relying on a copy of the contents of the register file. An exemplary embodiment detects the presence of an error when reading data from one copy of the register file, and proceeds to move the contents from another copy of the register file which is recognized as error free into the corrupted copy of the register file. In an exemplary embodiment an instruction to perform the copying is inserted automatically into the processor execution pipeline (e.g., the arithmetic pipeline).

As used herein, the term "pipeline" refers to computer processing that is dispersed among different stages. In a pipeline, each stage is working on a discrete task/function, and one stage feeds the next stage in a sequential manner. The different stages work in parallel on their given tasks. In a pipeline, the output from one stage is the input to a next stage. Pipelines may be implemented in hardware and/or software. As used herein, the term "arithmetic pipeline" refers to a pipeline that is processing an arithmetic instruction. An arithmetic pipeline may include multiple stages such as one stage that multiplies two numbers and another stage that adds a third number to the product from the previous stage.

Exemplary embodiments correct errors in the register file by running a specialized error-correction instruction on the processor itself. That is, an exemplary embodiment uses the hardware (i.e., in a way that is transparent to the software and operating system) and a processor instruction (i.e., an instruction in the processor instruction set) to correct a soft error in a register file.

In an exemplary embodiment, two copies of the register file holding identical data are maintained, referred to herein as having a second register file that mirrors a first register file. The two copies of the register file both include multiple locations for storing data (i.e. registers). The registers are individually accessible via an address or index into the register file. Register files that are mirror copies of each other have the same data at the same addressable locations. In the event of a soft error, as long as one does not occur at the same address in both copies of the register file, which is highly unlikely, the normal operation of the machine is temporarily interrupted, and the data from the good copy of the register file is read out and written to the bad copy of the register file. Even if a particle disturbs multiple parity groups, as long as at least one parity group has an odd number of bits that have been compromised, and the same address in the other copy of the register file has not been disturbed, then the problem can be detected and corrected.

In an exemplary embodiment, state machines and recovery logic hardware in the processor handle this entire recovery operation, including the detection of the parity error, the capturing of the offending address in the register file, and the generation and insertion of the instruction to correct the problem. All of these tasks are completely hidden from the operating system and applications. This may lead to a higher speed and more efficient error correction when compared to contemporary error correction processes.

FIG. 1 illustrates a block diagram of a system for performing recovery for register file soft errors that may be implemented by an exemplary embodiment. In exemplary embodiments, the arithmetic pipeline may be implemented as a fixed-point pipeline (to execute a fixed-point arithmetic instruction) or a floating-point pipeline (to execute a floating-point arithmetic instruction).

FIG. 1 depicts a control unit 104, which issues instructions to and provides data to an arithmetic unit 102. The arithmetic unit 102 includes register file 106 and register file 108, as well as an arithmetic pipeline 110. In an exemplary embodiment, the arithmetic unit 102 loads the data in register file 106 and register file 108, and the arithmetic pipeline 110 processes the instructions and performs arithmetic on the register file data (i.e., the data read from registers in register file 106 and/or register file 108). When a soft error occurs on register file data, the next time that register is read by virtue of an instruction which calls for its use via a read address within the instruction, error detection circuitry 114 will detect the soft error (e.g., using a parity bit), and error recovery circuitry 116 will notify the control unit 104 of its existence, while signaling address capture circuitry 112 to capture the address of the offending register. In an exemplary embodiment, the control unit 104 flushes that instruction from the arithmetic pipeline 110, brings the system to a state of quiescence, such that there are no instructions within the arithmetic unit 102 and all subsequent instructions are held in a stalled state within the control unit 104. The control unit 104 then signals to the error recovery circuitry 116 to begin the error recovery sequence.

The error recovery circuitry 116 inserts, via the address capture circuitry 112, one or more instructions within the arithmetic pipeline 110. The inserted instruction(s) read the offending register file data (e.g., a register), once from each copy (i.e., from register file 106 and register file 108), select the good version based on knowledge gathered from re-detecting the error (as described further herein below), and write it back to the register in both copies of the register file (i.e., register file 106 and register file 108), thereby correcting the soft error. Once the good data is safely written to both copies of the register file, the error recovery circuitry 116 signals to the control unit 104 that the recovery sequence is complete. The control unit 104 then resumes normal operation, by re-issuing the original instruction, which caused the detection of the soft error. In an exemplary embodiment, the entire operation is performed in hardware, completely transparent to the operating system and application software.

In an exemplary embodiment, the error recovery circuitry 116, error detection circuitry 114 and address capture circuitry 112 are located in the arithmetic unit 102. In an alternate exemplary embodiment, the address capture circuitry 112 is part of the error recovery circuitry 116. In an exemplary embodiment, the address capture circuitry 112 is located in the arithmetic unit 102 and the address is captured during normal operation so that it is available during the error recovery process. In an exemplary embodiment, the error recovery circuitry 116, error detection circuitry 114 and address capture circuitry 112 are implemented in hardware.

In an exemplary embodiment, the error detection and correction is performed by soft error recovery circuitry in a floating point processing engine. The floating point processor can be a scalar or a vector processing engine, with the ability to compute arithmetic on floating point formatted data. In an exemplary embodiment, the data is stored in a floating point register file as depicted below:

"seeeeeeeeeeeee-iffffffffffffffffffffffffffffffffffffffffffffffffffffppppppppppp"

In an exemplary embodiment, register file entries (e.g., registers) contain seventy-eight bits: one sign bit ("s"), thirteen exponent bits ("e"), one implicit bit ("i"), fifty-two fraction bits ("f"), and eleven parity bits ("p"). In this example, the equations for the parity bits may be expressed as:

$p_{67} = e_i$ xor $e_3$ xor $e_5$ xor $e_7$ xor $e_9$ xor $e_{11}$ xor $e_{13}$ $p_{68} = e_2$ xor $e_4$ xor $e_6$ xor $e_8$ xor $e_{10}$ xor $e_{12}$ $p_{69} = s_0$ xor $f_{15}$ xor $f_{17}$ xor $f_{19}$ xor $f_{21}$ xor $f_{23}$ $p_{70} = i_{14}$ xor $f_{16}$ xor $f_{18}$ xor $f_{20}$ xor $f_{22}$ xor $f_{24}$ $p_{71} = f_{25}$ xor $f_{27}$ xor $f_{29}$ xor $f_{31}$ xor $f_{33}$ xor $f_{35}$ $p_{72} = f_{26}$ xor $f_{28}$ xor $f_{30}$ xor $f_{32}$ xor $f_{34}$ xor $f_{36}$ $p_{73} = f_{37}$ xor $f_{39}$ xor $f_{41}$ xor $f_{43}$ xor $f_{45}$ xor $f_{47}$ $p_{74} = f_{38}$ xor $f_{40}$ xor $f_{42}$ xor $f_{44}$ xor $f_{46}$ xor $f_{48}$ $p_{75} = f_{49}$ xor $f_{52}$ xor $f_{55}$ xor $f_{58}$ xor $f_{61}$ xor $f_{64}$ $p_{76} = f_{50}$ xor $f_{53}$ xor $f_{56}$ xor $f_{59}$ xor $f_{62}$ xor $f_{65}$ $p_{77} = f_{51}$ xor $f_{54}$ xor $f_{57}$ xor $f_{60}$ xor $f_{63}$ xor $f_{66}$ The parity bit, along with the bits of the register file to which it is associated, are referred to as a parity group.

Figure 2:
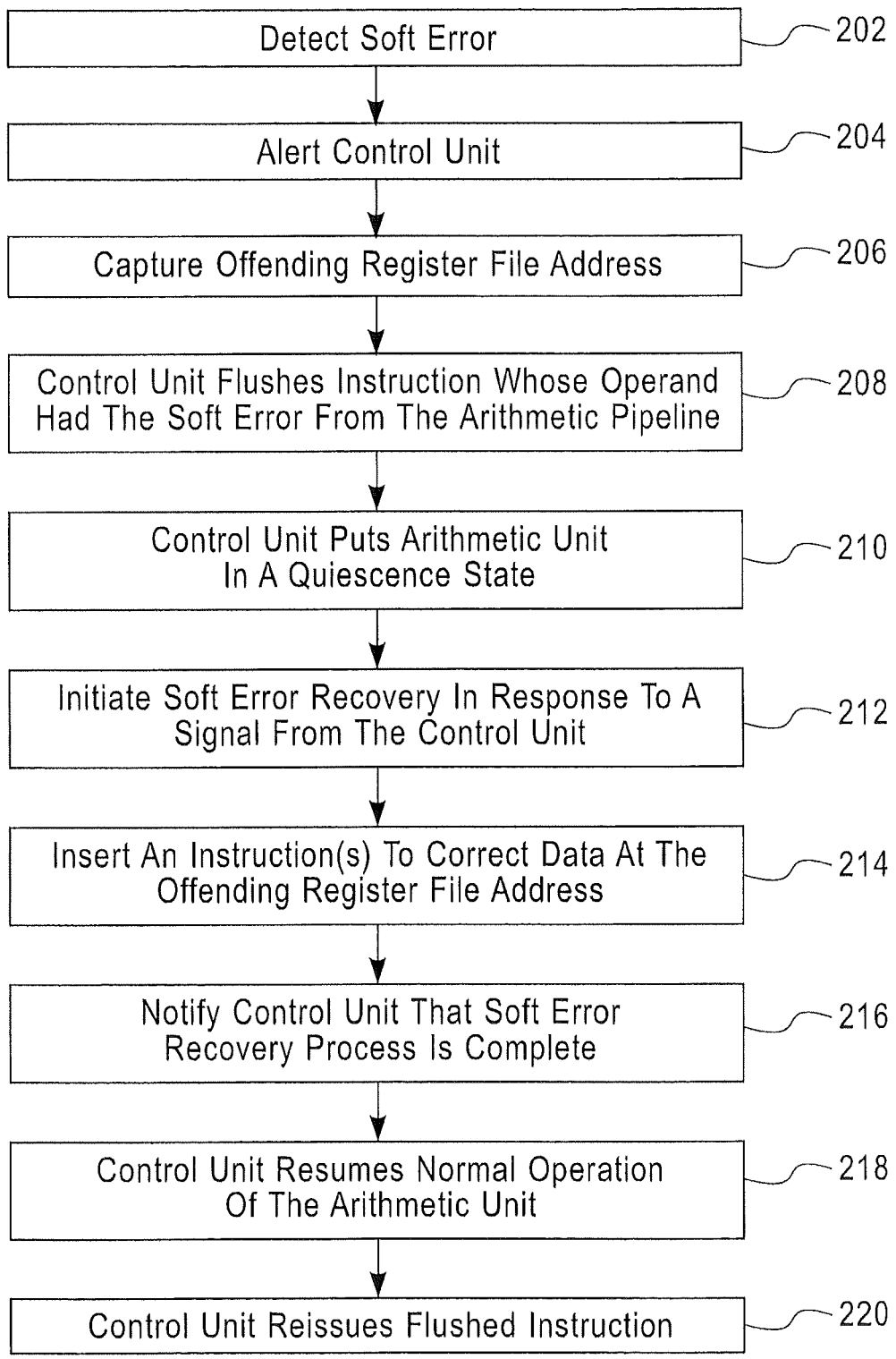
FIG. 2 illustrates a process flow for performing recovery for register file soft errors that may be implemented by an exemplary embodiment.

An exemplary sequence of events for detecting and correcting a parity error is depicted in FIG. 2. At block 202, a soft error is detected by the error detection circuitry 114. In an exemplary embodiment, the soft error is detected using a parity bit that detects a parity error. A parity error is detectable as long as at least one parity group contains an odd number of compromised bits (also referred to herein as "corrupted data"). At block 204, the control unit 104 is alerted (e.g., via an error detect signal) and at block 206, the offending register file address (or index) is captured by the address capture circuitry 112. At block 208, the control unit 104 flushes the instruction whose operand had a soft error from the arithmetic pipeline and at block 210, the control unit 104 puts the arithmetic unit 102 into a quiescent state.

At block 212 in FIG. 2, the error recovery circuitry 116 initiates soft error recovery in response to receiving a signal (e.g., a begin-recovery-sequence signal) from the control unit 104. At block 214, the error recovery circuitry 116 automatically inserts one or more error recovery instructions to correct the corrupted data at the offending register file address. The error recovery instruction(s) cause a read of the offending register again, once from the copy of the register file with the soft error, and once from the copy of the register file without the soft error, which will produce the same parity error again, only this time the control unit 104 will not be notified of the existence of the parity error. When the parity error is correctable, the arithmetic pipeline 110 selects whichever operand is correct, and writes the result back to a target address, in both copies of the register file (register file 106 and register file 108). In an exemplary embodiment, the parity error is correctable if there is not a coincidental soft error in the other register file at the same address.

In an exemplary embodiment, the error recovery instruction is a quad-vector-floating-point select (QVFsel) instruction. The QVFsel instruction reads data from the offending address via the B and C operands, from the B and C copies of the register file, respectively. If the parity error was within the C copy, then the B data is written back to both copies of the register file. If the parity error was within the B copy, then the C data is written back to both copies of the register file.

At block 216, the error recovery circuitry 116 notifies the control unit 104 that the soft error recovery process has been completed. In an exemplary embodiment, the notification is via a "recovery_sequence_finished" signal. At block 218, the control unit 104 resumes normal operation of the arithmetic unit 102 (includes resetting control state machines) and at block 210, the control unit 104 reissues the flushed instruction.

Exemplary embodiments are described in terms of a single instruction/multiple data (SIMD) processor, but can be applied to the generic case of any processor pipeline with duplicated register files.

Technical effects and benefits include the ability to perform error recovery in a more efficient and less obtrusive manner than conventional ECC based mechanisms. This may lead to a higher speed and more efficient error correction when compared to contemporary error correction processes.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system for performing soft error recovery, the system comprising:
    a first register file;
    a second register file mirroring the first register file;
    an arithmetic pipeline for receiving data read from the first register file;
    error detection circuitry to detect whether the data read from the first register file includes corrupted data; and
    error recovery circuitry to insert an error recovery instruction into the arithmetic pipeline in response to detecting the corrupted data, the inserted error recovery instruction to replace the corrupted data in the first register file with a copy of the data from the second register file, wherein the error recovery instruction is a quad-vector-floating-point select (QVFsel) instruction.

2. The system of claim 1, wherein the arithmetic pipeline further receives data read from the second register file, the error detection circuitry further detects whether the data read from the second register file includes corrupted data, and the error recovery circuitry further inserts an error recovery instruction into the arithmetic pipeline in response to detecting the corrupted data, the inserted error recovery instruction causing the corrupted data in the second register file to be replaced with a copy of the data from the first register file.

3. The system of claim 1, wherein the error detection circuitry and error recovery circuitry are implemented in hardware.

4. The system of claim 1, wherein the arithmetic pipeline enters a quiescent state in response to detecting the corrupted data and exits the quiescent state after the inserted error recovery instruction has completed.

5. The system of claim 1, wherein the system further comprises a control unit for flushing an instruction associated with the corrupted data in response to detecting the corrupted data and for reissuing the flushed instruction after the inserted error recovery instruction has completed.

6. The system of claim 5, wherein the error recovery circuitry operates independently of the control unit.

7. The system of claim 1, wherein the arithmetic pipeline is one of a floating point pipeline and a fixed point pipeline.

8. The system of claim 1, wherein input to the detecting includes parity bits.

9. A computer implemented method for performing soft error recovery, the method comprising:
    receiving data read from a first register file, the receiving at an arithmetic pipeline in a computer;
    detecting, using error detection circuitry in the computer, whether the data read from the first register file includes corrupted data; and
    inserting an error recovery instruction into the arithmetic pipeline in response to detecting the corrupted data, the inserting performed by error recovery circuitry, the inserted error recovery instruction causing the corrupted data in the first register file to be replaced with a copy of the data from a second register file that mirrors the first register file, wherein the error recovery instruction is a quad-vector-floating-point select (QVFsel) instruction.

10. The method of claim 9, further comprising:
    receiving data read from the second register file, the receiving at the arithmetic pipeline;
    detecting, using the error detection circuitry, whether the data read from the second register file includes corrupted data; and
    inserting an error recovery instruction into the arithmetic pipeline in response to detecting the corrupted data in the second register file, the inserting performed by error recovery circuitry, the inserted error recovery instruction causing the corrupted data in the second register file to be replaced with a copy of the data from the first register file.

11. The method of claim 9, wherein the error detection circuitry and error recovery circuitry are implemented in hardware on the computer.

12. The method of claim 9, wherein the arithmetic pipeline enters a quiescent state in response to detecting the corrupted data and exits the quiescent state after the inserted error recovery instruction has completed.

13. The method of claim 9, wherein the method further comprises:

flushing an instruction associated with the corrupted data in response to detecting the corrupted data, the flushing initiated by a control unit; and reissuing the flushed instruction after the inserted error recovery instruction has completed, the reissuing initiated by the control unit.

14. The method of claim 13, wherein the error recovery circuitry operates independently of the control unit.

15. The method of claim 9, wherein input to the detecting includes parity bits.

16. A computer program product for performing soft error recovery, the computer program product comprising:

a non-transitory tangible storage medium readable by a processing circuit and storing instructions for execution by the processing circuit for performing a method comprising:

receiving data read from a first register file;

detecting whether the data read from the first register file includes corrupted data; and inserting an error recovery instruction into an arithmetic pipeline in response to detecting the corrupted data, the inserted error recovery instruction causing the corrupted data in the first register file to be replaced with a copy of the data from a second register file that mirrors the first register file, wherein the error recovery instruction is a quad-vector-floating-point select (QVFsel) instruction.

17. The computer program product of claim 16, wherein the arithmetic pipeline enters a quiescent state in response to detecting the corrupted data and exits the quiescent state after the inserted error recovery instruction has completed.

18. The computer program product of claim 16, wherein the method further comprises:

flushing an instruction associated with the corrupted data in response to detecting the corrupted data; and reissuing the flushed instruction after the inserted error recovery instruction has completed.

\* \* \* \* \*